G. AMBORN.
CHAIN PIPE VISE OR THE LIKE.
APPLICATION FILED DEC. 27, 1911.
1,040,603.
Patented Oct. 8, 1912.
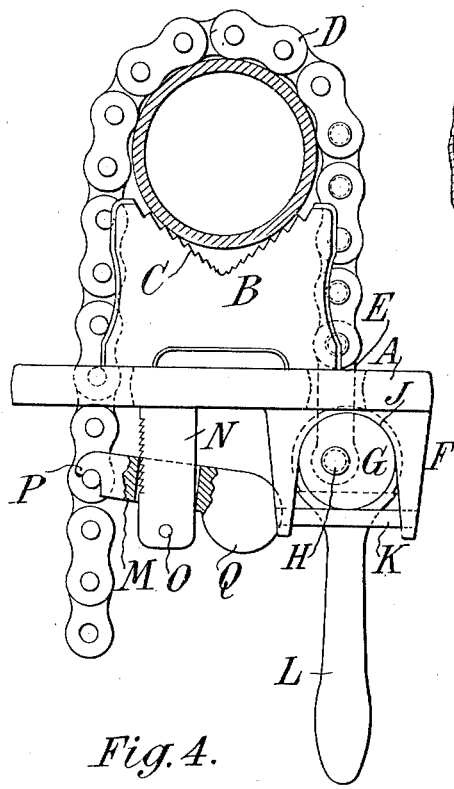
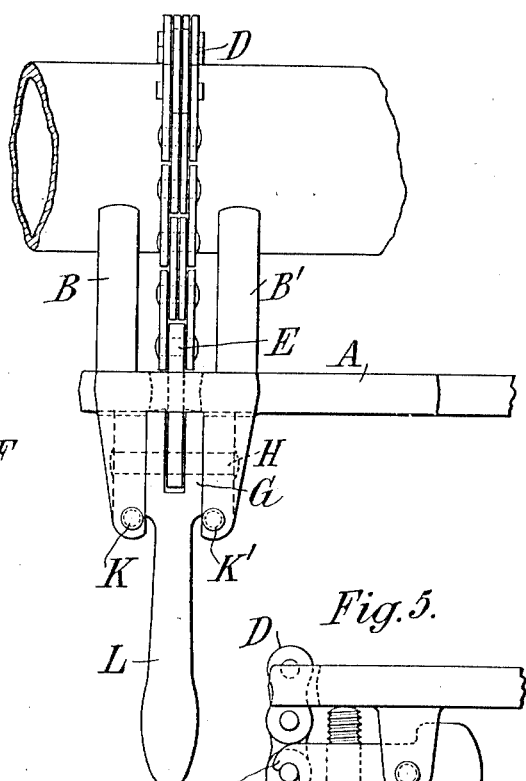
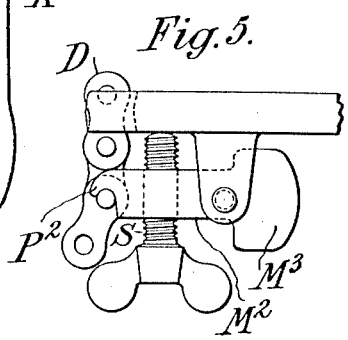
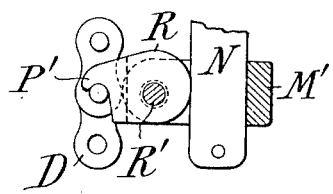
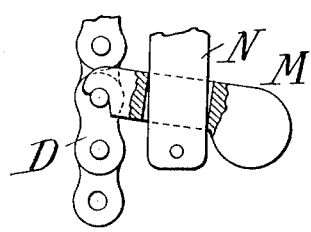
WITNESSES:
René Bruine
Fred White
INVENTOR:
George Amborn,
By Attorneys,
Fraser, Turler & Myers

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

CHAIN PIPE-VISE OR THE LIKE.

1,040,603.      Specification of Letters Patent.      Patented Oct. 8, 1912.

Application filed December 27, 1911. Serial No. 668,060.

*To all whom it may concern:*

Be it known that I, GEORGE AMBORN, a citizen of the United States, residing in Chapinville, in the county of Litchfield and State of Connecticut, have invented certain new and useful Improvements in Chain Pipe-Vises or the Like, of which the following is a specification.

In the common form of chain pipe vise a jaw or jaws are provided which are formed with working faces upon which the pipe rests. The pipe is clamped to the jaws by a chain which is usually connected at one end to some form of take-up mechanism, while the opposite end is adapted to adjustably engage a lock or locks formed upon the bed plate of the vise. In the operation of such vises it is necessary that the chain be slack in order to engage it with its lock, and this slackness must be taken up by a take-up mechanism in order that the pipe may be clamped against the jaws. The take-up mechanism is usually in the form of a screw of some kind, and this screw may be constructed to operate rapidly by increasing the pitch of its threads. Such rapid adjusting means, however, are disadvantageous in that it requires considerable power to clamp the pipe with the requisite firmness.

The principal object of the present invention is to provide a construction in which the chain may be rapidly adjusted to take up the major portion of the slack so that a slight additional movement will be sufficient to adequately and firmly clamp the pipe. This slight additional clamping movement is preferably provided by a part which is of high power efficiency so that it may be turned without undue expenditure of strength. This may be accomplished in various ways, but I prefer to construct the vise with a part which operates upon the free end of the chain to take up the slackness of the latter, while the supplemental tightening movement is performed by a part connected to the opposite end of the chain.

In the accompanying drawings wherein I have illustrated several embodiments of the invention,—Figure 1 is a side elevation partly in section of one form of the invention. Fig. 2 is a front elevation thereof. Fig. 3 is an elevation partly in section of a slight modification of Fig. 2. Fig. 4 is a view of another modification. Fig. 5 is a view of a third modification.

Referring first to Figs. 1 and 2, let A indicate a suitable bed plate upon which are mounted a jaw or jaws B B' having working faces C designed to support the pipe. The latter is held in position upon the jaws by a chain D. The front end of the chain is connected by a link E to a tightening device F which is preferably of high power. This would produce a correspondingly slow motion if the device F were relied upon to take up the entire slack in the chain. However, as its function is merely to produce a small and powerful movement of the chain, its own total range of movement may be made quite small. I prefer to employ for this purpose an eccentric G which is connected to the link E by a pivot pin H, the eccentric being slotted as shown in Fig. 2 to receive the link. The eccentric moves in a circular bearing J, and is held from dropping out of the same by a pair of pins K K'. An operating handle L is preferably provided which may be formed integral with the eccentric.

By preference the quick take-up device is designed to operate in connection with the opposite or free end of the chain which heretofore has usually been locked to stationary locks provided on the bed plate. In the preferred construction of my invention the locks are carried by or form a part of the quick take-up mechanism. In the construction shown in Fig. 1 this quick take-up mechanism comprises a slidable arm M which is preferably slotted through its middle and slides along a fixed pin N projecting from the bottom of the bed plate, a suitable cross pin O being provided to prevent the arm M from dropping from the pin N when the chain is not engaged therewith. The arm M is formed at its rear end with a lock P which in the present structure is designed to engage the pintles of the chain, although it may make engagement with the chain in any other manner. The opposite end of the arm is weighted at Q so that the lock end of the arm has a tendency to tilt upwardly.

In operation when the pipe is laid upon the jaws and the chain passed around it, the free end of the chain is engaged with the lock P and the arm M moves to the lowest position which it can assume, either by gravity or by the assistance of the operator. In this position the slack of the chain is practically all taken up so that it only remains to tighten the chain slightly, in order to clamp the pipe firmly against the jaws. This is accomplished in the present construction by moving the handle L outwardly, thus turning the eccentric G. The arm M under these conditions will remain tightly clamped against the pin N without appreciable upward movement. If desired the pin N may have its rear face roughened or serrated as illustrated in Fig. 1, or may be made smooth as indicated in Fig. 3.

In Fig. 4 I have shown a modification in which the lock P' instead of being formed directly upon the arm M' is formed upon a cam R pivoted at R' to the arm M', its front face contacting with the rear face of the pin N. When so constructed the arm and lock will move downwardly by their own weight while a slight upward movement of the chain is sufficient to bind the arm to the pin.

In Fig. 5 I have shown a construction in which the lock P' P² is formed upon a pivot lever M² which is preferably weighted at M³. The lock is adjusted in this case by hand by means of a thumb screw S which passes through the rear end of the lever and engages the under side of the bed plate. This thumb screw is preferably formed with threads of a steep pitch so that it may be operated quickly to take up the slack in the chain.

While I have shown and described several modifications of the invention, it is understood that I do not wish to be limited thereto, as various changes may be made therein without departing from the spirit of the invention.

What I claim is:—

1. A chain pipe vise including in combination a jaw adapted to engage the under side of the pipe and to support the same, a chain having one end adapted to be held fast at one side of the pipe and the other end free and adapted to be passed over the pipe and locked at the other side thereof at determined intervals in the length of the chain, so as to embrace pipes of different diameters, means for quickly taking up the slack of said chain after its free end is locked, and additional means for finally slowly tightening the chain.

2. A chain pipe vise including in combination a jaw adapted to engage the under side of the pipe and to support the same, a chain having one end adapted to be held fast at one side of the pipe and the other end free and adapted to be passed over the pipe and locked at the other side thereof at determined intervals in the length of the chain, so as to embrace pipes of different diameters, means for quickly taking up the slack of said chain after its free end is locked, and additional means for finally slowly tightening the chain, said quick take-up means and said slow tightening means acting respectively on opposite ends of the chain.

3. A chain pipe vise including in combination a jaw adapted to engage the under side of the pipe and to support the same, a chain having one end adapted to be held fast at one side of the pipe and the other end free and adapted to be passed over the pipe and locked at the other side thereof at determined intervals in the length of the chain, so as to embrace pipes of different diameters, locking means for said free end of the chain, means in engagement with said locking means for quickly taking up the slack of said chain after said free end is locked, and additional means for finally slowly tightening the chain.

4. In a chain pipe vise or the like, a jaw, a movable lock, a chain adapted to engage the lock at determined intervals in the length of the chain, and means for tightening the chain.

5. In a chain pipe vise or the like, a jaw, a chain, a movable lock adapted to engage the rear end of the chain and to be moved downwardly to take up the slack in the latter, and a take-up mechanism for tightening the chain.

6. In a chain pipe vise or the like, a jaw, a chain, a movable lock adapted to engage the rear end of the chain and to be moved downwardly to take up the slack in the latter, and an eccentric for tightening the chain.

7. In a chain pipe vise or the like, a movable arm having a lock for the chain, a slideway for said arm, said arm being adapted to automatically engage said slideway when a tension is put on the chain, and additional means for putting the chain under tension.

8. In a chain pipe vise or the like, a movable arm having a lock for the chain, a slideway for said arm, said arm being adapted to automatically engage said slideway when a tension is put on the chain, and means for putting the chain under tension, said means comprising an eccentric connected to the front end of the chain.

In witness whereof, I have hereunto signed my name in the presence of two subscribing witnesses.

GEORGE AMBORN.

Witnesses:
CHARLES B. HARRIS,
VICTOR F. ROBINS.